Patented Feb. 4, 1936

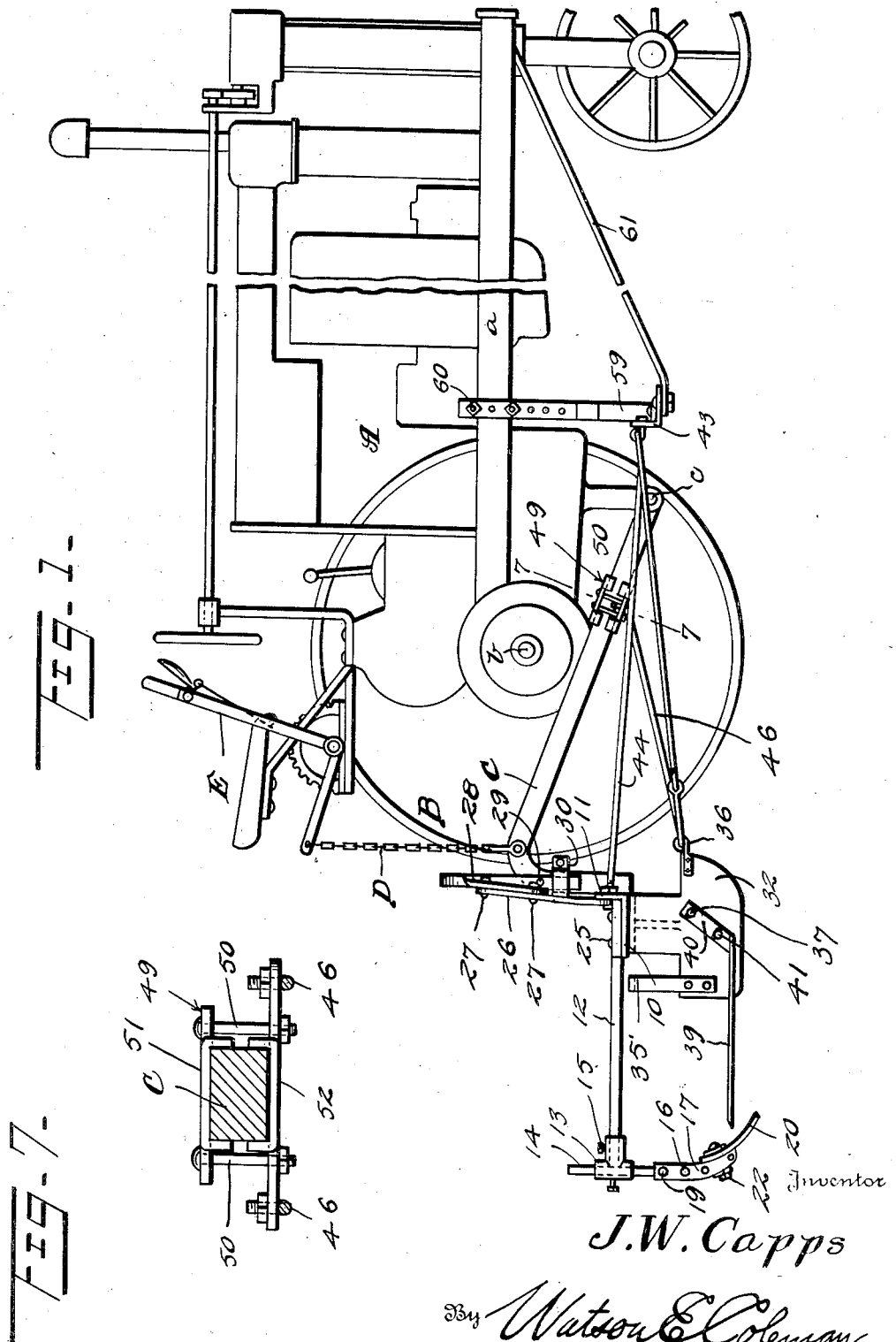

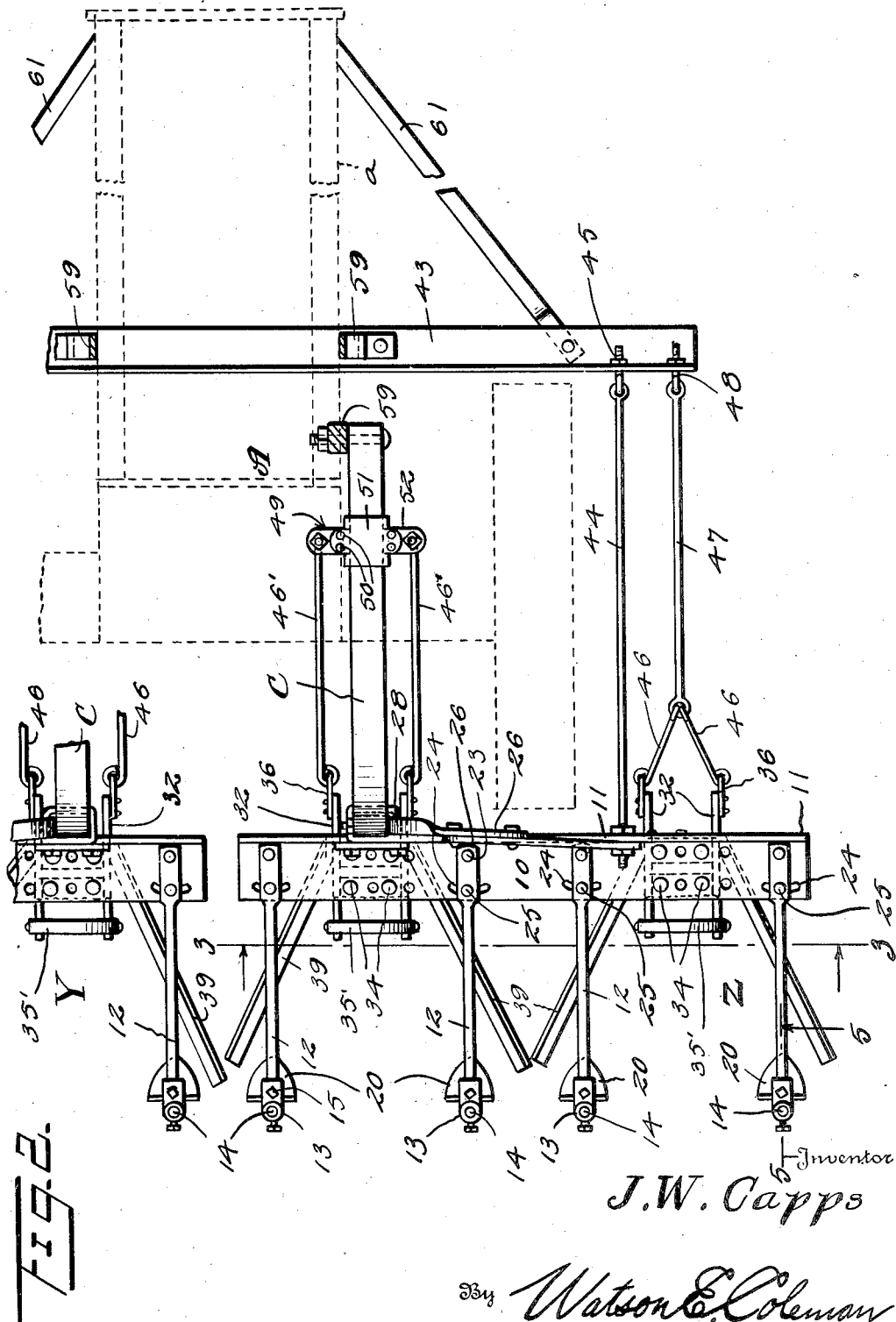

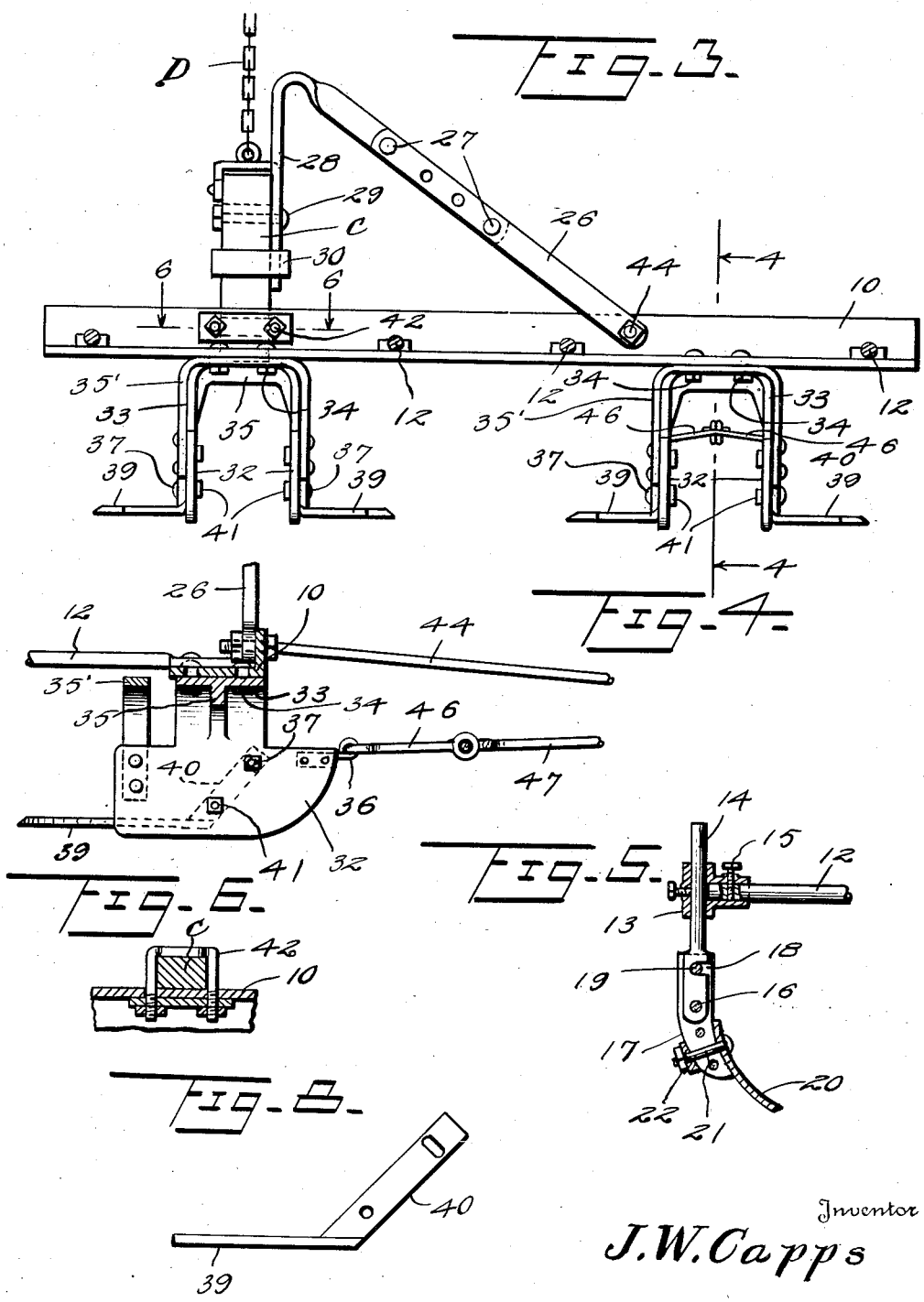

2,029,652

UNITED STATES PATENT OFFICE 2,029,652

CULTIVATOR ATTACHMENT FOR TRACTORS

Joseph W. Capps, Portales, N. Mex., assignor of one-half to Emmit Sidney Capps, Pecos, Tex.

Application August 6, 1935, Serial No. 35,012

6 Claims. (Cl. 97—47)

This invention relates to cultivating attachments and particularly to what are known as "godevils" designed to cultivate between rows and at the same time cut the weeds on each side of a row.

One object of my invention is to provide an attachment of this character which is relatively light and easily handled and which, particularly, may be readily raised to discharge trash at any time and as readily lowered, and which is readily raised or lowered at the ends of the rows to permit turning of the tractor and attachment.

Another object is to provide an attachment of this character which may be readily applied to cultivator tractors having the usual cultivator beams.

Other objects will appear in the course of the following description.

My invention is illustrated in the accompanying drawings wherein

Figure 1 is a side elevation of a tractor with my attachment connected thereto.

Fig. 2 is a fragmentary top plan view of the attachment, the tractor being indicated in dotted lines.

Fig. 3 is a rear elevation of one of the transversely extending runner supporting beams, the base therefor, and the runners connected thereto, parts being in section and the section being taken on the line 3—3 of Fig. 2.

Fig. 4 is a vertical sectional view on the line 4—4 of Fig. 3.

Fig. 5 is a detail vertical section through one of the cultivator shovels and the clamp for receiving the upper end of the standard of the shovel.

Fig. 6 is a section on the line 6—6 of Fig. 3.

Fig. 7 is a section on the line 7—7 of Fig. 1.

Fig. 8 is a view in elevation of one of the cutting knives unapplied.

Referring to the drawings, A designates generally a tractor provided with the usual tractor wheels B and the beams C disposed below the axle $b$ and extending rearward of the axle. Each beam C is pivotally supported at its forward end, as at $c$, and is connected at its rear end to a lift chain D which in turn is connected to a bell crank lever E operating over a toothed sector to which it may be locked in adjusted position.

As hereinbefore stated, Fig. 2 is a fragmentary top plan view, in that it shows more than one-half of the complete cultivating attachment which is made in two sections, a right section and a left section. Inasmuch as both sections are alike and both sections are connected to the tractor in the same manner, I have not deemed it necessary to illustrate both sections complete, and the description which is applicable to one section is equally applicable to the other. These two sections are designated generally Y and Z. Each section includes a transversely extending angle iron base member 10 which is horizontally disposed and which is provided with the upwardly extending flange 11, as clearly illustrated in Fig. 1. This base member 10 of each section Y or Z is designed to extend across two rows to be cultivated, and attached to the base member 10 are the rearwardly projecting cultivator standards 12. As illustrated in Figs. 1 and 5, each of these standards 12 at its rear end is mounted on a T 13 providing a socket for the rear end of the standard 12 and a sleeve for the reception of the shank 14. Square-ended set screws 15 hold this T in adjusted position upon the standard 12 and with reference to the shank 14.

Pivoted to the lower end of the shank 14 by pivots 16, are a pair of downwardly and forwardly curved members 17 which embrace the lower end of the shank 14. This lower end of the shank 14 is widened and it and the members 17 are slotted, as at 18, for the reception of a clamp or break pin 19.

Mounted on the lower ends of the members 17 are shovels 20 which are shiftable upon the concave edge faces of the members 17 but are held in adjusted position by any suitable means, such as bolts 21, one of which is shown in detail in Fig. 5, these bolts passing through openings in the shovel shanks and being held by nuts 22. By this means the shovels may be adjusted upward or downward upon the members 17 and the shank may be adjusted vertically through the sleeve 13.

The forward ends of the standards 12 are illustrated as being pivoted to the base members 10 by means of the pivot bolts 23. The base member 10 rearward of each pivot bolt is formed with an arcuate slot 24, and an adjusting bolt 25 passes downward through the standard 12 so that thereby the standard may be adjusted angularly with relation to the angle iron base member 10. Thus by shifting these standards 12 in one direction or the other provision is made for adjusting the plows or shovels 20 to suit different widths of rows, and furthermore the shanks 14 may be rotatably adjusted within the member 17 so that the shovel points will be directed parallel to the line of draft without regard to the angularity of the standards 12.

Bolted to the angle iron base member 10 is a brace 26, as best illustrated in Fig. 3, this brace being formed in two perforated sections. Bolts 27 pass through these sections so that the sections may be adjusted one upon the other to thus elongate or contract the brace. The upper section of the brace is angularly bent, at 28, and extends downward beside the downwardly curved end of the beam C and is attached thereto by a bolt 29 and by a clamp 30. It is also connected to the angle iron base member 10 by means of a bolt 44 and thus the beam C is rigidly connected to the corresponding base member 10 and by reason of the brace 26 the vertical movement of the rear end of the beam will lift or lower the base member 10 bodily when the rear end of the beam is lifted or lowered by means of the chain D and the bell crank hand lever E. It is, of course, to be understood that there is a lever E and a chain D for each beam C.

Bolted to the angle iron base member 10 at spaced points are a plurality of runners 32, each pair of runners being connected to or integrally formed with an arch 33 bolted to the base member 10 by means of bolts 34. Preferably each of these arches 33 is strengthened by a transverse web 35. The runners, as illustrated best in Fig. 4, extend forward and rearward of the arch and each runner at its forward edge is curved downward and rearward. Each runner at its forward end has formed therewith a hook 36 and is provided with at least one aperture for the passage of a bolt 37, and beneath the aperture for the bolt 37 there is formed an arcuate slot 38.

Cutting knives 39 are provided which, as best illustrated in Fig. 2, extend angularly to the line of draft, these cutting knives extending angularly downward from the respective runners and having obliquely up-turned shanks 40, each shank being secured to the runner by the bolts 37 and 41. Preferably the runners are provided with transversely extending arches 35' bolted or otherwise secured thereto so as to prevent them from spreading and to hold them securely in shape.

The angle iron base member 10, as shown in Figs. 3 and 7, may be connected to the vertical portion of the plow beam C by means of the U-bolt 42, as best illustrated in Fig. 6.

As illustrated best in Fig. 2, there is disposed beneath the tractor and extending transversely thereof, an angle iron draw bar 43, and a draw rod 44 extends from this draw bar through the flange 11 of the base member 10 and carries a nut. The forward end of this draw rod 44 is provided with an eye and the flange of the transverse draw bar 43 carries an eye-bolt 45, whereby it is flexibly connected to the draw bar 43. Each of the runners is connected by a link 46 to the hooks 36 hereinbefore mentioned, these links 46 converging.

The outermost pair of runners, 32 of each section Y or Z is connected by the links 46 to a draw rod 47, which in turn is flexibly connected by the eye-bolt 48 to the draw bar 43, but each of the inner pair of runners, as illustrated in Fig. 2, is connected by parallel links 46' to a clamp 49, which consists of upper and lower members 51 and 52 clamped upon the beam C by means of the bolts 50.

The draw bar 43 is supported from the sides of the tractor by downwardly extending brackets 59 attached to the frame beam a of the tractor by U-bolts 60 or other suitable means, these brackets being formed with a vertical series of apertures through which the legs of the U-bolts pass. The lower end of the bracket may be angularly bent and bolted to the horizontal flange of the draw bar 43. This draw bar extends entirely across the tractor beneath the body thereof and is braced from the forward end of the frame of the tractor by means of the angular braces 61.

The draft on the base members 10 is distributed to the draw bar and to the beams C by means of the rods 44 and 47 and the links 46 and 46', so that very little strain comes upon the beams C. By raising or lowering the beams C the attachment may be raised or lowered and thus trash which may collect upon the shovels or upon the knives extending therefrom may be readily dumped whenever desired. The runners travel over the surface of the ground and thus support the shovels so that they will penetrate the ground to a proper depth. The knives are adjustable to cut into the ground to a greater or less extent as may be desired.

While the preceding description and the accompanying drawings specify what I consider to be the preferred embodiment of my invention, it is to be understood that various changes may be made in the construction and arrangement of the different parts without departing from the scope of the invention as claimed.

I claim:

1. The combination with a tractor having a pair of rearwardly extending pivoted beams, and means for raising or lowering the rear ends of said beams, of transversely extending base members operatively connected to the beams for vertical movement therewith, pairs of runners mounted upon the undersides of said base members, cultivator shovels carried by the base members and extending rearwardly therefrom, a draw bar operatively connected to the tractor and extending transversely across the same, an operative connection between the outer pairs of runners and the draw bar and between the inner pairs of runners and the beams, and an operative draft connection between the base members and said draw bar.

2. In an attachment of the character described, a longitudinally extending beam, means for supporting said beam pivotally at its forward end whereby its rear end may be raised and lowered, a transversely extending base member connected to said beam, runners carried by said base member and extending underneath the same, knives carried by said runners, shovel standards also carried by said base members and extending rearwardly therefrom and rearward of the runners, and shovels carried by said standards.

3. In an attachment of the character described, a longitudinally extending vertically adjustable beam, means for supporting said beam, a transversely extending base member connected to said beam, runners carried by said base member and arranged in pairs extending underneath said base member, knives carried by said runners, shovel standards pivotally connected at their forward ends to said base member and extending rearwardly therefrom, means for adjusting said shovel standards laterally and holding them in adjusted position, and shovels carried by the rear ends of said shovel standards.

4. In an attachment of the character described, a longitudinally extending beam, means for supporting said beam so that it may be adjusted vertically, a transversely extending base member connected to said beam, arched runners connected to said base member and extending underneath same in a longitudinal direction, knives formed with upwardly extending forward ends connected to said runners, shovel standards connected at their forward ends to the base member and extending rearwardly therefrom, shovels carried by said shovel standards, and arched members extending transversely of and connected to the runners, as and for the purpose set forth.

5. In an attachment of the character described, a longitudinally extending beam, means for supporting said beam whereby its rear end may be raised or lowered and held in adjusted positions, a transversely extending base member connected to said beam, a draw bar in advance of said beam, draw rod connections between said base member and said draw bar, runners carried by said base member, knives carried by said runners, shovel standards also carried by said base member and extending rearwardly therefrom, and shovels carried by said standards.

6. In an attachment of the character described, a longitudinally extending beam, a transversely extending base member connected to said beam, runners carried by said base member, shovel standards connected to said base member and extending rearwardly therefrom, T in which the rear ends of said shovel standards are received, vertically disposed shovel shanks adjustably mounted in said T's, and shovels carried by said shanks.

JOSEPH W. CAPPS.